United States Patent Office 3,082,196
Patented Mar. 19, 1963

3,082,196
OLEFIN POLYMERIZATION USING $AlCl_3$-ω
OR Ta CATALYST
Gaetano F. D'Alelio, South Bend, Ind., assignor, by direct and mesne assignments, to Dal Mon Research Co., Cleveland, Ohio, a corporation of Delaware
No Drawing. Filed Feb. 3, 1960, Ser. No. 6,356
19 Claims. (Cl. 260—93.7)

This invention is concerned with the polymerization of olefins such as ethylene, propylene, butene-1, styrene, butadiene, isoprene, and the like olefins in an inert solvent in the presence of a catalyst prepared by reacting a mixture consisting essentially of an aluminum halide, for example, aluminum chloride, and at least one metal selected from the group consisting of tantalum and tungsten. This is a continuation-in-part of applicants copending application, Serial No. 718,946, filed March 4, 1958, now abandoned.

Friedel-Crafts type catalysts are not effective in converting ethylene to high molecular weight solid polymers but they do produce liquid or low molecular weight polymers. More recently it has been reported that a mixture of solid polymers and liquid polymers may be obtained by polymerizing ethylene in the presence of a mixture of aluminum chloride and titanium tetrachloride at high pressures and elevated temperatures, preferably in the presence of metals which bind the hydrogen chloride released from the titanium tetrachloride. The Friedel-Crafts catalysts are even less effective in converting olefins such as propylene, butene-1, pentene-1, hexene-1, etc., vinyl cyclohexane, vinyl cyclohexene, butadiene, 2-methylbutadiene-1,3, etc., or in general monomers having a $CH_2=CH-$ or a $CH_2=C<$ structure, referred to herein as alpha-olefins, to high molecular weight solid or rubbery polymers. The catalysts of this invention are effective polymerization catalysts for such olefins and related olefins.

I have now discovered that $AlCl_3$ may be used to produce high molecular weight solid polymers of ethylene and of other olefins if the aluminum chloride is first reacted with a metal selected from the group of tantalum and tungsten. The reaction between the aluminum chloride and the metal may be effected in any suitable manner. Preferably the metal should be in a finely divided form and mixed with the aluminum chloride. This mixture may be ground or milled together for a suitable time to produce an active polymerization catalyst for olefins. Also, they may be heated together at temperatures above room temperature and preferably at temperatures between 200–400° C. to produce a catalyst suitable for the polymerization of olefins. The catalyst prepared by heating the metal and the aluminum chloride may be ground or ball-milled after heating to increase the activity of the catalyst. The nature of the catalysts of this invention is unknown but they appear to be compounds that contain reactive and unstable metal to metal bonds; for example, the reaction product of one mole of tantalum with one mole of aluminum chloride behaves as if it were $Cl_2Al \cdot TaCl$ and is pyrophoric and extremely reactive with water, alcohols, ketones, and the like.

I do not wish to be bound by this theory because of the complex nature of the reaction, but it may be observed readily that a reaction does occur between the free metal and the aluminum chloride since part or all of the metal loses its identity during the reaction. Instead of aluminum chloride, an aluminum halide, such as the fluoride, bromide, or iodide may be used. For economic reasons, the chloride is preferred.

The time required for the reaction of the metal with aluminum halide to give the catalyst composition of this invention depends on the intimacy of contact and the temperature. For whatever reagents are in intimate contact, the reaction is almost instantaneous even at room temperature. This fact generally is evidenced by a change in color in the materials.

For example, grinding of the reagents of Example I at room temperature for half an hour produces sufficient of the catalyst composition to produce solid polymer of ethylene when tested according to the polymerization technique used in Example I. By using the grinding technique to effect intimate contact and raising the temperature, the time required to produce an equivalent amount of catalyst as produced in the above instance is correspondingly reduced. For example, approximately the same amount of catalytic material as obtained above, is obtained when the aforesaid grinding operation is performed at 50° C. for 15 minutes, at 100° C. for 10 minutes, at 150° C. for 5 minutes, or at 170° C. for 2 minutes. At 200–400° C., the reaction is instantaneous and there is no advantage in using any higher temperature, although higher temperatures do not produce any bad effects on the catalyst.

In the absence of grinding and the intimate contact of the reagents produced thereby, the rate of reaction depends on the particle size of the reagents and the uniform distribution thereof. In such cases, the reagent particles which are in intimate contact with each other will react rapidly, but further progress of the reaction depends on the diffusion of one reagent into contact with the other. In the case of aluminum chloride, which sublimes at 178° C., this diffusion is expedited by the conversion of aluminum chloride to the vapor state. For that reason, temperatures above about 180° C., preferably above 200° C., promote rapid reaction, depending on the particle size of the metal. Even in cases of relatively large particle sizes of metal, the metal becomes coated with the catalytic reaction product and continued reaction depends on the rate of diffusion of the aluminum chloride vapor through this reaction product. Unless considerable excess of aluminum chloride is used in such cases, the sublimed material should be retained in the reaction zone or recycled until the reaction has reached the desired stage.

It is also possible to obtain some degree of conversion by allowing an intimate mixture of the finely divided reagents to stand in an inert atmosphere for prolonged periods. For example, an intimate mixture of finely divided reagents of Example I, after standing in an atmosphere of helium for three weeks is found to have a catalytic activity approximately that obtained by grinding at the various temperatures and minimum periods indicated above.

The catalysts of this invention are extremely reactive and sensitive to contaminants such as moisture, oxygen, and the like, and, therefore, should be processed under inert conditions, such as in the presence of nitrogen, or the noble gases, such as helium, neon, argon, etc. They are also strong reducing agents and are oxidized easily.

The grinding and milling operations may be performed as a dry operation in the absence of an inert hydrocarbon. Sometimes it is more convenient to wet grind the mixture of the metal and the aluminum halide by adding an inert hydrocarbon to the mixture to be ground or ball-milled. The hydrocarbon, if used, is preferably one that will not interfere with the subsequent polymerization reaction and preferably is the same hydrocarbon used in the polymerization reaction. Also, the milling or grinding can be carried out partly by dry grinding in an inert atmosphere and then an inert hydrocarbon added to the mill toward the end of the milling in order to slurry the product for ease of handling.

The ratio of the metal to the aluminum halide that may be used in the preparation of the catalysts of this invention is not critical, e.g., between 1 part metal to 100 parts $AlCl_3$ to 100 parts metal to 1 part $AlCl_3$. Particularly satisfactory results are obtained in the ranges of from 1 part of metal to 3 parts of aluminum chloride to 3 parts of metal to 1 part of aluminum chloride. It also has been found that the nature of the catalyst resulting from the ratio of metal to the aluminum halide determines the nature of the polymer obtained. If large amounts of aluminum chloride are used, or if the reaction between the metal and the aluminum chloride leaves large amounts of aluminum chloride in the catalyst mixture lower molecular weight polymers are obtained than if lesser amounts are present. In such cases, and if desired, the excess aluminum chloride may be removed from the catalyst mixture by subliming the chloride by heating the mixture or by passing an inert gas, such as helium or a noble gas, through the heated catalyst, or by selective extraction with an aromatic hydrocarbon, such as benzene, toluene, or xylene, etc.

In some cases it may be desirable to retain in the solid polymeric olefin product, the low molecular weight polymeric olefins simultaneously prepared by such excess aluminum halide which has not been removed from the aluminum halide-metal reaction product. If not desired for plasticizing purposes, such low molecular weight polymeric olefins also can be removed by extraction. In cases where excess metal is used, the product may consist of particles having a metal core which is coated with the aluminum halide-metal reaction product. The product can be used directly in this form since the catalytic reaction product is available for contact with the olefin to be polymerized, and the excess metal has no adverse effect on the polymerization.

As a polymerization medium substantially any inert material may be used, which is liquid under the conditions of temperature and pressure employed and which has a solvent action in the olefin polymerized. Hydrocarbon solvents are preferred and preferably are free substantially of materials that react with the catalyst, such as $O_2$, $H_2O$, alcohols, ketones, and the like. Suitable solvents include pentane, hexane, cyclohexane, octane, benzene, toluene, xylene, and the like. The aromatic hydrocarbons are preferred. In some cases, the monomer or mixtures of monomers, if liquid, may be used as a polymerization medium, for example, such as styrene, isoprene, 2,3-dimethylbutadiene-1,3, vinyl cyclohexene, etc.

The amount of catalyst is not critical. Relatively small amounts are operable to form relatively large amounts of polymer. In general, a practical range is 0.001 to 0.1 mole catalyst per mole of olefin polymerized. Even larger amounts of catalysts are operable but are uneconomical and make the polymer more difficult to purify. When low molecular weight polymers are obtained by the process of this invention, they are useful as chemical intermediates in alkylation, epoxidation, chlorination, sulfonation, etc., and as plasticizers for the solid polymers produced by the procedures described herein.

The catalysts as prepared in the practice of this invention are useful in polymerizing olefins at temperatures ranging from about room temperature up to 200° C. or even higher and at pressures ranging from atmospheric or a few atmospheres to pressures as high as 10,000 p.s.i. or higher. For practical operations temperatures in the range of 70–200° C. and pressures of 100–200 p.s.i. are suitable.

The following examples illustrate without limiting the invention:

*Example I*

Ten grams of finely ground tungsten and 1 gram of $AlCl_3$ are ground in an atmosphere of pure nitrogen for 200–300 hours in a conventional stainless steel ball-mill of about 4 ounce capacity about ½ full of ½ inch stainless steel balls. Five grams of the resulting catalyst are suspended in 50 ml. of toluene in a 200 ml. stainless steel, stirred autoclave. The transfer from the mill to the autoclave is made in a dry box under slight pressure of nitrogen to avoid contamination with moisture and oxygen. After the catalyst is transferred, the autoclave is sealed and pressured with ethylene to about 500 p.s.i. and heated to a temperature of about 150° C. During the polymerization reaction frequent repressuring with ethylene is necessary. At the end of 16 hours, the polymerization is stopped even though ethylene is still being absorbed. The reactor is cooled, vented, and opened, and the crude polyethylene transferred to a container containing 500 ml. of methanol acidified with HCl and refluxed for 2 hours. The purified solid white polyethylene is separated by filtration and dried, and weighs about 78 grams.

If instead of tungsten, tantalum, or a mixture of tungsten and tantalum is used in the above reaction with $AlCl_3$, a catalyst, similar in polymerization performance to the catalyst produced from tungsten and $AlCl_3$ is obtained.

*Example II*

An electrically heated vertical furnace made of a quartz tube 10 inches long and ¾ inch I.D., wrapped with electrically heating resistance wire is filled with a mixture of 5 grams of tantalum and 10 grams of aluminum chloride and the gas in the tube replaced by helium to give an inert atmosphere. The furnace is then heated to about 300° C. for 12–24 hours. Any aluminum chloride that sublimes from the reaction mixture may be returned to the reaction or may be replaced by new aluminum chloride by passing a heated inert gas, such as helium or a noble gas, through heated aluminum chloride and passing this gas through the tube. Alternately, the tantalum and the $AlCl_3$ may be sealed in the quartz tube and the sealed tube heated. The reaction product may be used directly as in Example I to give an excellent yield of high molecular weight, high density polyethylene.

As an alternate procedure, the catalyst of this example may be freed of excess aluminum chloride by passing an inert gas through the heated quartz tube until aluminum chloride ceases to sublime from the mixture. The activity of the catalyst can be increased by balling the catalyst prepared by heating the metal and the aluminum chloride. The cooled catalyst is transferred in an inert medium and ground in a ball mill according to the procedure of Example I for 72 hours. This ground catalyst is used to polymerize ethylene at temperatures between 70–100° C. and at pressures between 250–500 p.s.i.

*Example III*

The catalyst of Example II is washed with toluene to remove nearly all residual $AlCl_3$ and placed in a 200 ml. capacity stainless steel rocking autoclave containing 50 ml. heptane. The autoclave is connected to a source of propylene, sealed and heated to a reaction temperature of 75° C. The propylene pressure initially is 160–175 p.s.i. and from time to time over a period of 24–36 hours is repressured with propylene as the polymerization proceeds. At the end of the reaction, the autoclave is cooled, vented, and the reaction mixture transferred to a container containing 200 ml. of methanol acidified with HCl and boiled for 30 minutes. The purified solid polypropylene is then removed by filtration and dried; yield, 45 grams. Substitution of the propylene by butene-1, hexene-1, octene-1, vinylcyclohexane, and vinylcyclohexene produce the corresponding polymers, whereas mixtures of these monomers produce copolymers.

*Example IV*

Catalysts similar to those of Example I and Example II also may be prepared by reacting the metal and the aluminum chloride in the stainless steel autoclave of Example I heated electrically to 400° C., thereby combining a heating and grinding operation in one step to produce active catalysts suitable for polymerizing a wide range of olefins.

*Example V*

Catalysts suitable for olefin preparation are prepared readily also by reacting the metal with the aluminum halide, as for example, aluminum chloride, aluminum iodide, etc., in an inert liquid medium. Two grams of finely ground vanadium and 5 grams of aluminum chloride in 50 ml. of benzene, or toluene, or chlorobenzene are refluxed in an inert atmosphere for 300 hours. The reaction mixture is transferred to an autoclave as in Example I and a similar high yield of high polymer is obtained.

The catalysts of this invention are very reactive ionic catalysts and pyrophoric. Surprisingly, they also form complexes with organometal compounds, such as, for example, the metal alkyls, e.g., phenyllithium, butyllithium, cyclohexyllithium, lithium aluminum tetrabutyl, Grignard reagents, etc. These complexes are active olefin catalysts especially useful in the production of cis polymers of isoprene, butadiene, and other conjugated dienes and diolefins. It is within the scope of this invention that the catalysts of this invention can be used in the form of their various organometal complexes to promote polymerization of olefins.

*Example VI*

Under inert conditions, there is added to 5 grams of the catalyst of Example II dispersed in 20 ml. of hexane, 2 grams of butyllithium, 10 ml. of hexane, and to this mixture there is added 50 grams of isoprene with 200 grams of hexane, and the mixture maintained at room temperature to 50° C. for 24 hours, after which 500 ml. of methanol is added to the polymer dispersion and refluxed for about ½ hour. The solvent is decanted from the polymer and vacuum dried. Yield of rubbery polymer, 43 grams. When styrene is used with the catalyst of this example, a fibrous polystyrene is obtained, and mixtures of styrene or other vinyl aryls with dienes or diolefins, such as butadiene or isoprene, clear high impact copolymers are obtained.

*Example VII*

Ten grams of finely ground tungsten and one gram of aluminum chloride are ground at room temperature in an atmosphere of pure nitrogen for one half hour, in a conventional stainless steel ball mill of about four ounce capacity, and about one half full of one inch stainless steel balls. The resultant product is suspended in toluene and tested for the polymerization of ethylene according to the procedure used in Example I. After the 16 hour polymerization period, the product is processed as in that example, and a little more than 2 grams of solid white polyethylene is recovered.

The foregoing procedure gives approximately similar results when repeated a number of times when the grinding is conducted at 50° C. for 15 minutes in one case; at 100° C. for 10 minutes in another case; at 150° C. for 5 minutes in a third case; and at 170° C. for 2 minutes in a fourth case.

Similar results are obtained when the above procedure is repeated using aluminum bromide, aluminum iodide, and aluminum fluoride, respectively, in place of the aluminum chloride.

*Example VIII*

An electrically heated furnace, similar to that used in Example II, containing 10 grams of finely divided tungsten in an atmosphere of helium, is heated to 200° C. Then, aluminum chloride vapor, prepared by heating aluminum chloride above 178° C., is passed through this bed of tungsten powder for approximately 2 minutes. The resultant product is then suspended in toluene and tested for its catalytic effect in polymerizing ethylene in accordance with the procedure of the preceding example. The results correspond approximately to those obtained in Example VII.

The above procedure and the procedure of Example VII are repeated using an equivalent amount of tantalum in place of the tungsten. Similar results are obtained.

The homopolymer- and copolymer-polyolefins obtained by the practice of this invention may be used in any conventional manner now being used with polyolefins formed by prior art procedures. These polyolefins may be used to make molding, film, filaments, pipe, tubing, tires, inner tubes, etc., using the same equipment and techniques customary for such polyolefins.

The invention claimed is:

1. The method of polymerizing to a solid polymer an unsaturated hydrocarbon having a $CH_2=C<$ group therein and having no less than 2 carbon atoms and no more than 8 carbon atoms per molecule which comprises reacting said olefin in an inert solvent containing a catalyst prepared by reacting under inert conditions, at a temperature in the range of room temperature to about 400° C., a mixture consisting essentially of an aluminum halide and a metal selected from the class consisting of tungsten and tantalum, said reaction being conducted by grinding said mixture at a temperature of at least room temperature and no more than 170° C., the minimum period of said grinding being inversely proportional to the temperature and within the range of at least two minutes with said 170° C. and at least one-half hour with said room temperature.

2. The method of claim 1 in which said reaction is effected by grinding said mixture at a temperature of approximately 50° C. for at least about 15 minutes.

3. The method of claim 1 in which said reaction is effected by grinding said mixture at approximately 100° C. for at least about 10 minutes.

4. The method of claim 1 in which said reaction is effected by grinding said mixture at approximately 150° C. for at least about 5 minutes.

5. The method of claim 1 in which said reaction is effected by grinding said mixture at approximately 170° C. for at least about 5 minutes.

6. The method of claim 1 in which said reaction is effected by heating said mixture to a temperature in the range of 200–400° C.

7. A process of claim 6 in which said aluminum halide is aluminum chloride.

8. The method of claim 1 in which said aluminum halide is aluminum chloride.

9. The method of polymerizing ethylene which comprises heating ethylene in a hydrocarbon solvent at a temperature of about room temperature to 200° C., and at a pressure of about atmospheric pressure to 10,000 p.s.i., said solvent containing a catalyst prepared by reacting under inert conditions and at a temperature in the range of room temperature to about 400° C., a mixture consisting essentially of aluminum chloride and a metal selected from the group consisting of tungsten and tantalum, said reaction being conducted by grinding said mixture at a temperature of at least room temperature and no more than 170° C., the minimum period of said grinding being inversely proportional to the temperature and within the range of at least two minutes with said 170° C. and at least one-half hour with said room temperature.

10. The method of claim 9 in which said reaction product is complexed with butyllithium before being used to catalyze said polymerization.

11. The method of polymerizing propylene which comprises heating propylene in a hydrocarbon solvent at a temperature of about room temperature to 200° C., and at a pressure of about atmospheric pressure to 10,000 p.s.i., said solvent containing a catalyst prepared by reacting under inert conditions and at a temperature in the range of room temperature to about 400° C., a mixture consisting essentially of aluminum chloride and a metal selected from the group consisting of tungsten and tantalum, said reaction being conducted by grinding said mixture at a temperature of at least room temperature and no more than 170° C., the minimum period of said grinding being inversely proportional to the temperature and within the range of at least two minutes with said 170° C. and at least one-half hour with said room temperature.

12. The method of claim 11 in which said reaction product is complexed with butyllithium before being used to catalyze said polymerization.

13. The method of polymerizing isoprene which comprises heating isoprene in a hydrocarbon solvent at a temperature of about room temperature to 200° C., and at a pressure of about atmospheric pressure to 10,000 p.s.i., said solvent containing a catalyst prepared by reacting under inert conditions and at a temperature in the range of room temperature to about 400° C., a mixture consisting essentially of aluminum chloride and a metal selected from the group consisting of tungsten and tantalum, said reaction being conducted by grinding said mixture at a temperature of at least room temperature and no more than 170° C., the minimum period of said grinding being inversely proportional to the temperature and within the range of at least two minutes with said 170° C. and at least one-half hour with said room temperature.

14. The method of claim 13 in which said reaction product is complexed with butyllithium before being used to catalyze said polymerization.

15. A polymerization catalyst prepared by the step of reacting in an inert medium and at a temperature in the range of room temperature to about 400° C., a mixture of an aluminum halide and a metal selected from the class consisting of tungsten and tantalum, said reaction being conducted by grinding said mixture at a temperature of at least room temperature and no more than 170° C., the minimum period of said grinding being inversely proportional to the temperature and within the range of at least two minutes with said 170° C. and at least one-half hour with said room temperature.

16. A polymerization catalyst of claim 15 in which said reaction mixture is heated at 200–400° C.

17. A polymerization catalyst of claim 15 in which said aluminum halide is aluminum chloride and said metal is tungsten.

18. A polymerization catalyst of claim 15 in which said aluminum halide is aluminum chloride and said metal is tantalum.

19. A process of preparing a polymerization catalyst comprising the step of heating to a temperature in the range of about 178° C. to about 400° C. an intimate mixture of aluminum chloride and a metal selected from the group consisting of tungsten and tantalum.

References Cited in the file of this patent

UNITED STATES PATENTS

| | | |
|---|---|---|
| 2,355,339 | Story | Aug. 8, 1944 |
| 2,899,415 | Truett | Aug. 1, 1959 |
| 2,915,514 | Denkowski | Dec. 1, 1959 |
| 2,925,392 | Seelbach et al. | Feb. 16, 1960 |
| 2,933,485 | D'Alelio | Apr. 19, 1960 |
| 2,938,020 | Matlack | May 24, 1960 |
| 3,004,962 | Mattlack | Oct. 17, 1961 |

FOREIGN PATENTS

| | | |
|---|---|---|
| 1,132,506 | France | Nov. 5, 1956 |